US012574186B2

(12) United States Patent
Ouchi

(10) Patent No.: US 12,574,186 B2
(45) Date of Patent: Mar. 10, 2026

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 18/659,160

(22) Filed: May 9, 2024

(65) Prior Publication Data

US 2024/0291619 A1     Aug. 29, 2024

Related U.S. Application Data

(63) Continuation of application No. 18/157,137, filed on Jan. 20, 2023, now Pat. No. 12,015,578, which is a
(Continued)

(30) Foreign Application Priority Data

Jan. 9, 2020     (JP) ................................. 2020-002435

(51) Int. Cl.
| | |
|---|---|
| *H04L 5/00* | (2006.01) |
| *H04W 84/12* | (2009.01) |
| *H04W 88/08* | (2009.01) |

(52) U.S. Cl.
CPC .......... *H04L 5/0053* (2013.01); *H04L 5/0048* (2013.01); *H04W 84/12* (2013.01); *H04W 88/08* (2013.01)

(58) Field of Classification Search
CPC .... H04L 5/0053; H04L 5/0048; H04W 84/12; H04W 88/08
See application file for complete search history.

(56) References Cited

U.S. PATENT DOCUMENTS

| | | | |
|---|---|---|---|
| 8,923,219 B2 | 12/2014 | Breit | |
| 9,300,371 B1 | 3/2016 | Zhang | |

(Continued)

FOREIGN PATENT DOCUMENTS

| | | |
|---|---|---|
| CN | 110536315 A | 12/2019 |
| CN | 110536315 B | 8/2022 |

(Continued)

OTHER PUBLICATIONS

Lou et al., "A comparison of implicit and explicit channel feedback methods for MU-M IMO WLAN systems" 2013 IEEE 24th Annual International Symposium on Personal, Indoor, and Mobile Radio Communications (PIMRC) (Sep. 2013).

*Primary Examiner* — Jay P Patel
(74) *Attorney, Agent, or Firm* — Carter, DeLuca & Farrell LLP

(57) ABSTRACT

A communication apparatus operable to act as a master-AP in a multi-AP (access point) coordination configuration that supports an IEEE802.11 series standard, selects a sounding method which is a method for transmitting a sounding packet for receiving a CSI report as feedback from a terminal apparatus in accordance with a CSI (channel state information) calculation capability in the terminal apparatus that is connected to the communication apparatus.

17 Claims, 14 Drawing Sheets

Related U.S. Application Data continuation of application No. 17/133,713, filed on Dec. 24, 2020, now Pat. No. 11,595,178.

(56) References Cited

U.S. PATENT DOCUMENTS

| | | | |
|---|---|---|---|
| 9,332,554 | B1 | 5/2016 | Heidari |
| 9,667,394 | B2 | 5/2017 | Lee |
| 9,985,708 | B2 | 5/2018 | Shapira |
| 10,448,343 | B2 | 10/2019 | Reial |
| 10,630,357 | B2 | 4/2020 | Luong |
| 11,082,876 | B2 | 8/2021 | Huang |
| 11,206,554 | B2 | 12/2021 | Vermani |
| 11,258,500 | B2 | 2/2022 | Dash |
| 11,304,135 | B2 | 4/2022 | Ouchi |
| 11,394,441 | B2 | 7/2022 | Schelstraete |
| 11,398,877 | B2 | 7/2022 | Xing |
| 11,552,828 | B2 * | 1/2023 | Schelstraete ........... H04B 7/088 |
| 11,696,354 | B2 | 7/2023 | Ryu |
| 12,088,434 | B2 * | 9/2024 | Schelstraete ........ H04L 25/0224 |
| 2007/0253501 | A1 | 11/2007 | Yamaura |
| 2011/0199946 | A1 | 8/2011 | Breit |
| 2011/0299480 | A1 | 12/2011 | Breit |
| 2012/0269158 | A1 | 10/2012 | Yamaura |
| 2012/0281631 | A1 | 11/2012 | Yamaura |
| 2013/0315330 | A1 | 11/2013 | Yamaura |
| 2013/0315333 | A1 | 11/2013 | Yamaura |
| 2014/0098681 | A1 * | 4/2014 | Stager ................... H04W 24/02 |
| | | | 370/252 |
| 2014/0154992 | A1 | 6/2014 | Silverman |
| 2015/0124900 | A1 | 5/2015 | Shapira |
| 2015/0333812 | A1 | 11/2015 | Breit |
| 2016/0127019 | A1 | 5/2016 | Schelstraete |
| 2016/0233932 | A1 | 8/2016 | Hedayat |
| 2017/0005713 | A1 | 1/2017 | Bejarano |
| 2017/0104563 | A1 | 4/2017 | Lee |
| 2017/0230155 | A1 | 8/2017 | Lee |
| 2017/0273129 | A1 | 9/2017 | Ouchi |
| 2018/0041263 | A1 | 2/2018 | Zhang |
| 2018/0205442 | A1 | 7/2018 | Oteri |
| 2018/0249506 | A1 | 8/2018 | Amiri |
| 2018/0262249 | A1 * | 9/2018 | Tsang ................. H04L 25/0224 |
| 2018/0310245 | A1 | 10/2018 | Ouchi |
| 2019/0007115 | A1 | 1/2019 | Luong |
| 2019/0028168 | A1 * | 1/2019 | Vermani ............. H04B 7/0617 |
| 2019/0036739 | A1 | 1/2019 | Lindskog |
| 2019/0045366 | A1 * | 2/2019 | Vermani ............... H04W 16/06 |
| 2019/0081664 | A1 * | 3/2019 | Vermani ............... H04L 5/0035 |
| 2019/0140709 | A1 * | 5/2019 | Guerra ................. H04B 7/0452 |
| 2019/0165971 | A1 | 5/2019 | Manolakos |
| 2019/0191392 | A1 | 6/2019 | Reial |
| 2019/0253184 | A1 | 8/2019 | Xing |
| 2019/0341988 | A1 | 11/2019 | Schelstraete |
| 2020/0045560 | A1 | 2/2020 | Vermani |
| 2020/0068605 | A1 | 2/2020 | Golitschek |
| 2020/0092850 | A1 | 3/2020 | Jiang |
| 2020/0112350 | A1 * | 4/2020 | Yang ................... H04B 7/0695 |
| 2020/0145072 | A1 | 5/2020 | Dash |
| 2020/0358486 | A1 | 11/2020 | Suh |
| 2020/0373985 | A1 | 11/2020 | Tsai |
| 2020/0403680 | A1 | 12/2020 | Li |
| 2021/0028962 | A1 * | 1/2021 | Schelstraete ........... H04B 7/088 |
| 2021/0058936 | A1 | 2/2021 | Gordaychik |
| 2021/0099901 | A1 | 4/2021 | Huang |
| 2021/0135816 | A1 | 5/2021 | Davydov |
| 2021/0143878 | A1 | 5/2021 | Suh |
| 2021/0227555 | A1 | 7/2021 | Lin |
| 2021/0307099 | A1 | 9/2021 | Ryu |
| 2021/0385779 | A1 * | 12/2021 | Oteri ...................... H04B 7/024 |
| 2021/0392502 | A1 | 12/2021 | Ouchi |
| 2021/0392682 | A1 | 12/2021 | Ouchi |
| 2022/0078709 | A1 | 3/2022 | Yang |
| 2022/0095279 | A1 | 3/2022 | Hwang |
| 2022/0141852 | A1 | 5/2022 | Zhang |
| 2022/0271814 | A1 | 8/2022 | Hao |
| 2022/0272631 | A1 | 8/2022 | Ouchi |
| 2023/0057296 | A1 | 2/2023 | Ouchi |
| 2023/0105580 | A1 * | 4/2023 | Schelstraete ......... H04B 7/0617 |
| | | | 370/329 |
| 2024/0430134 | A1 * | 12/2024 | Schelstraete ........ H04L 25/0224 |

FOREIGN PATENT DOCUMENTS

| | | | | |
|---|---|---|---|---|
| EP | 2289176 | B1 * | 5/2018 | ........... H04B 7/0615 |
| EP | 4277154 | A2 * | 11/2023 | ........... H04B 7/0643 |
| JP | 2016-526856 | T | 9/2016 | |
| WO | 2015/006537 | A | 1/2015 | |
| WO | 2017/066330 | A1 | 4/2017 | |
| WO | 2018/039527 | A1 | 3/2018 | |
| WO | 2019/005379 | A1 | 1/2019 | |
| WO | 2019/214504 | A1 | 11/2019 | |
| WO | 2020/119412 | A1 | 6/2020 | |

* cited by examiner

F I G. 2
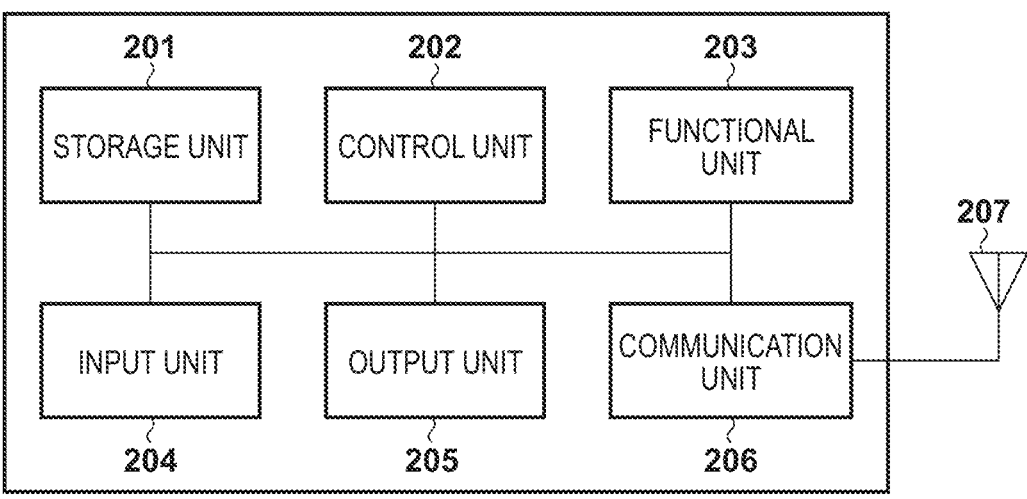

F I G. 3A
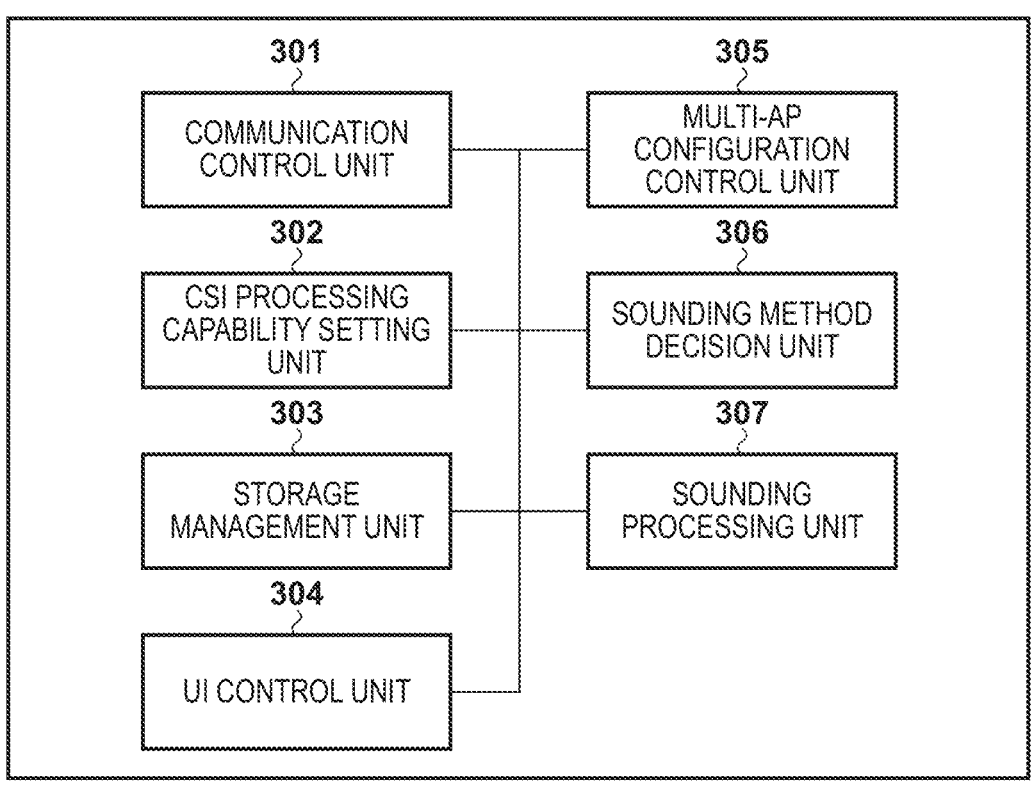
| | |
|---|---|
| 301 COMMUNICATION CONTROL UNIT | 305 MULTI-AP CONFIGURATION CONTROL UNIT |
| 302 CSI PROCESSING CAPABILITY SETTING UNIT | 306 SOUNDING METHOD DECISION UNIT |
| 303 STORAGE MANAGEMENT UNIT | 307 SOUNDING PROCESSING UNIT |
| 304 UI CONTROL UNIT | |
F I G. 3B
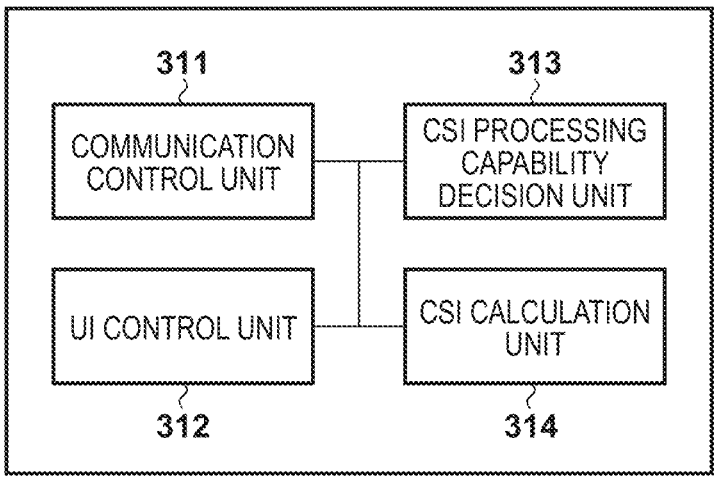
| | |
|---|---|
| 311 COMMUNICATION CONTROL UNIT | 313 CSI PROCESSING CAPABILITY DECISION UNIT |
| 312 UI CONTROL UNIT | 314 CSI CALCULATION UNIT |

F I G. 5
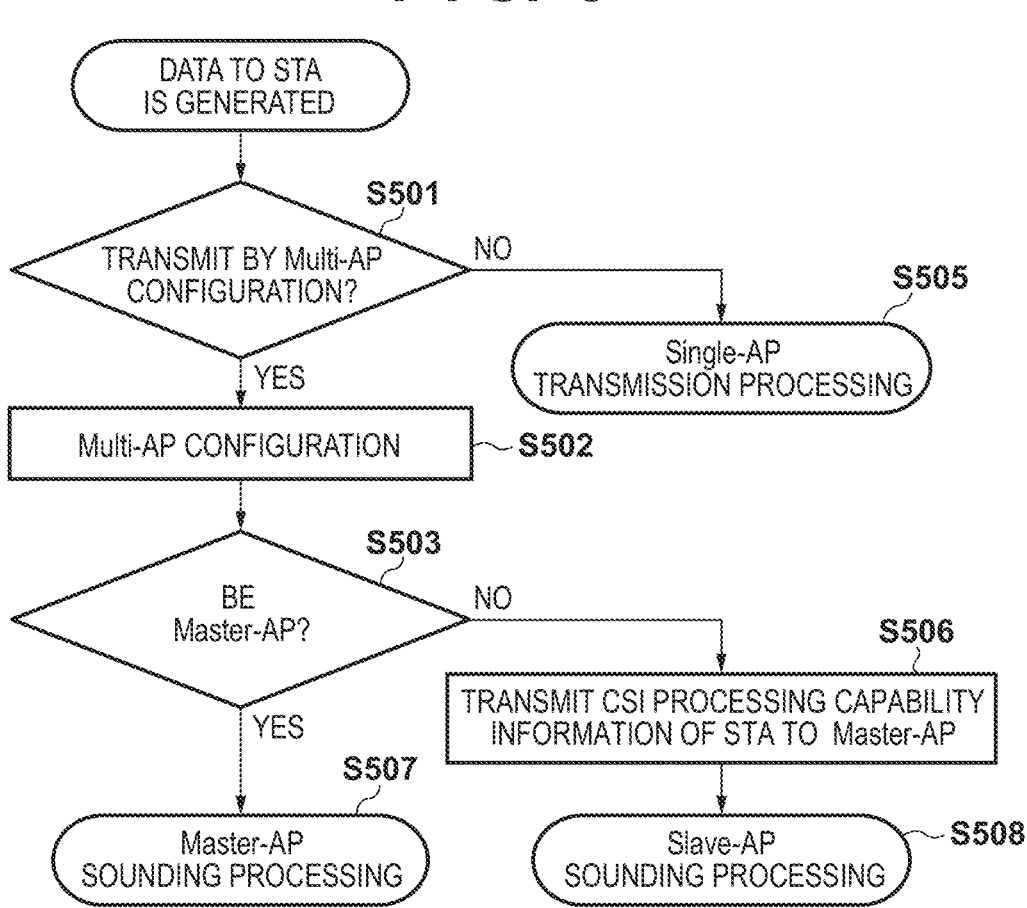

F I G. 6
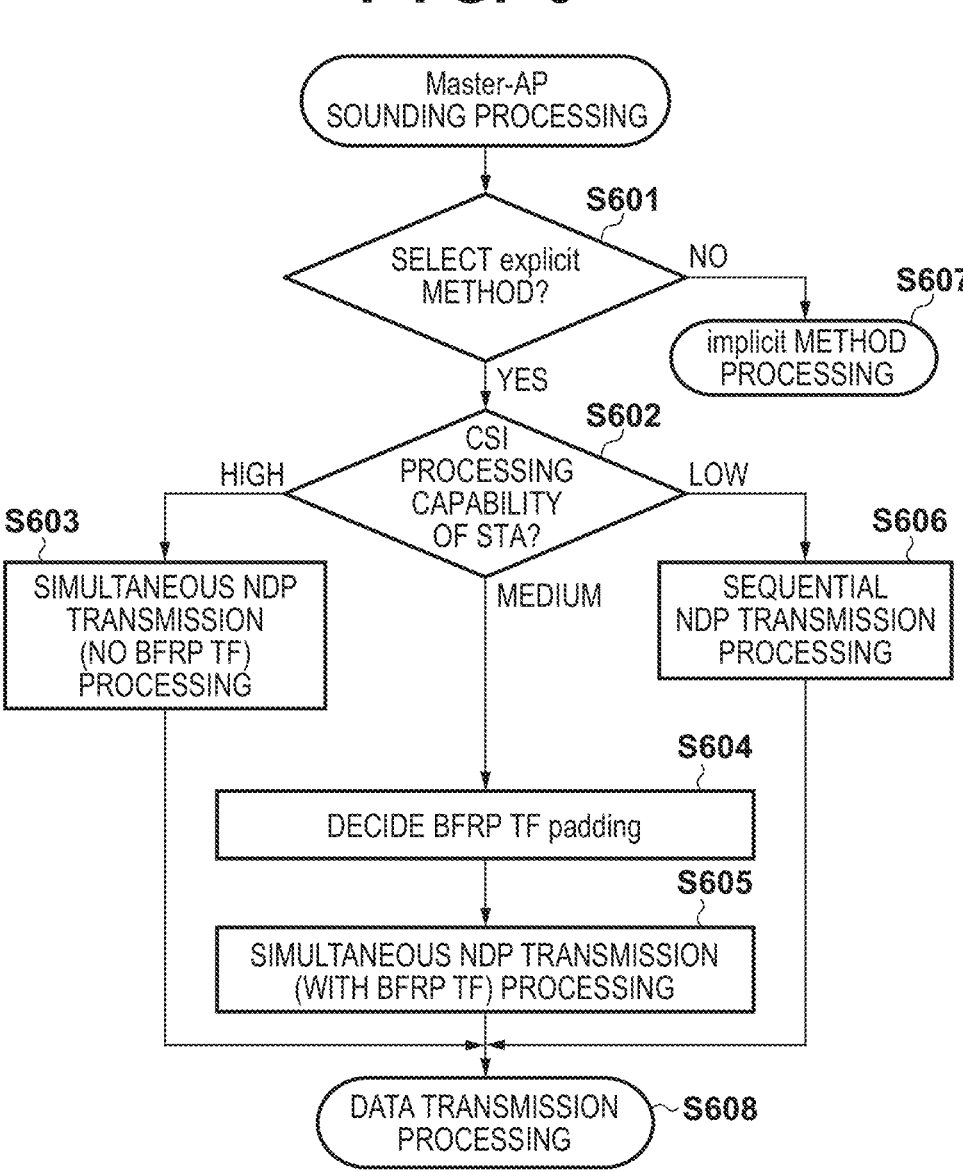

FIG. 9

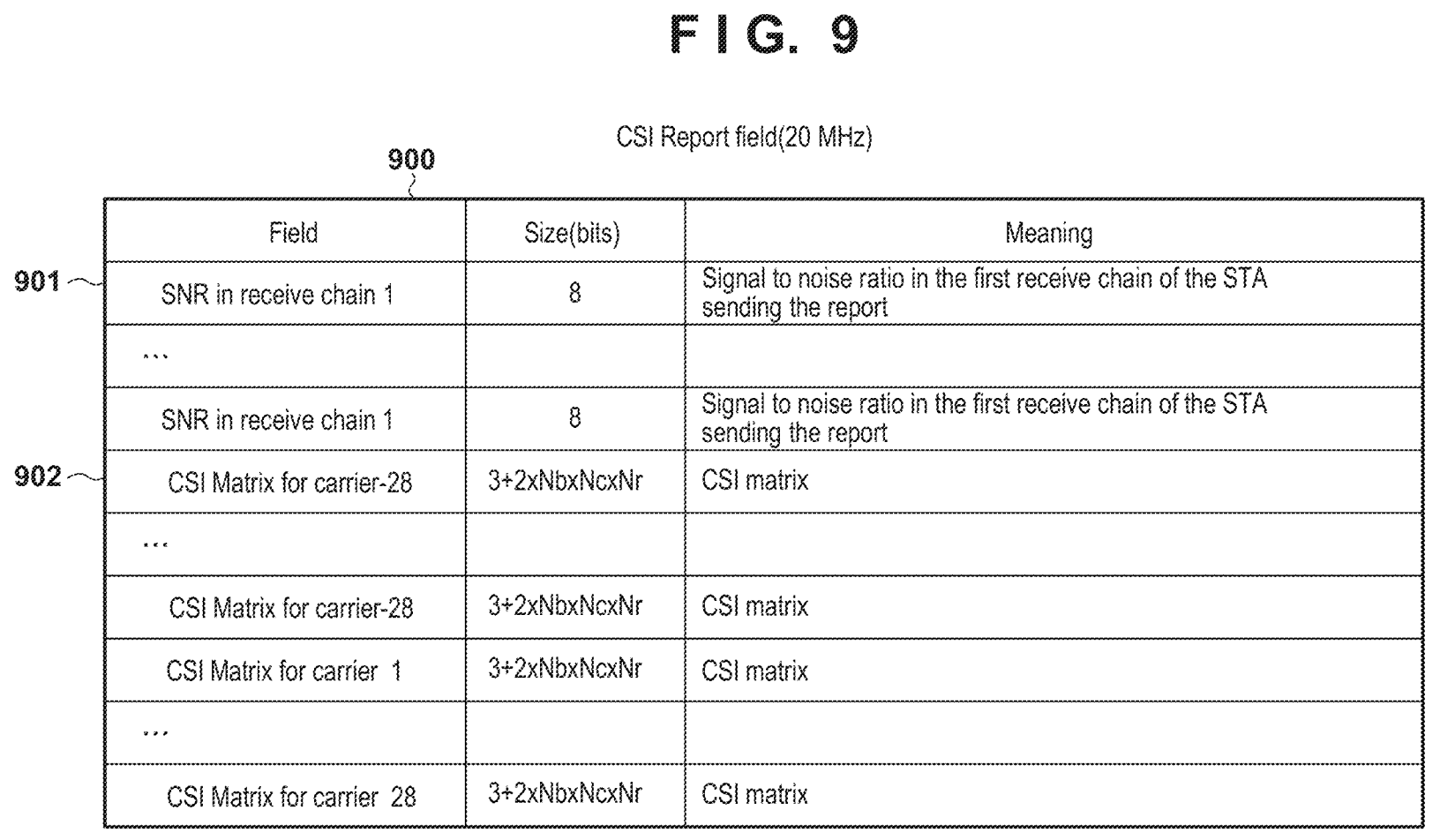

CSI Report field(20 MHz)

900

| Field | Size(bits) | Meaning |
|---|---|---|
| SNR in receive chain 1 | 8 | Signal to noise ratio in the first receive chain of the STA sending the report |
| ... | | |
| SNR in receive chain 1 | 8 | Signal to noise ratio in the first receive chain of the STA sending the report |
| CSI Matrix for carrier-28 | $3+2 \times Nb \times Nc \times Nr$ | CSI matrix |
| ... | | |
| CSI Matrix for carrier-28 | $3+2 \times Nb \times Nc \times Nr$ | CSI matrix |
| CSI Matrix for carrier 1 | $3+2 \times Nb \times Nc \times Nr$ | CSI matrix |
| ... | | |
| CSI Matrix for carrier 28 | $3+2 \times Nb \times Nc \times Nr$ | CSI matrix |

MIMO Control field

1001 1002 1003

| Nc Index | Nr Index | MIMO Control Channel Width | Grouping (Ng) | Co-efficient Size | Codebook Information | Re-maining Matrix Segment | Reserved | Sounding Timestamp |
|---|---|---|---|---|---|---|---|---|
| 2 | 2 | 1 | 2 | 2 | 2 | 3 | 2 | 32 |

B0  B1  B2  B3  B4  B5  B6  B7  B8  B9  B10  B11  B13  B14  B15  B16  B47

Bits

10a

HE MIMO Control field

1001 1002 1003

| Nc Index | Nr Index | BW | Grouping | Codebook Infor-mation | Feedback Type | Re-maining Matrix Segment | First Feedback Segment |
|---|---|---|---|---|---|---|---|
| 3 | 3 | 2 | 1 | 1 | 2 | 3 | 1 |

B0  B2  B3  B5  B6  B7  B8  B9  B10  B11  B12  B14  B15

| RU Start Index | RU End Index | Sounding Dialog Token Number | Disallowed Subchannel Bitmap Present | Reserved | Disallowed Subchannel Bitmap | Reserved |
|---|---|---|---|---|---|---|
| 7 | 7 | 6 | 1 | 3 | 0 or 8 | 0 or 8 |

B16  B22  B23  B29  B30  B35  B36  B37  B39  B40  B47  B48  B55

Bits

10b

F I G.  11
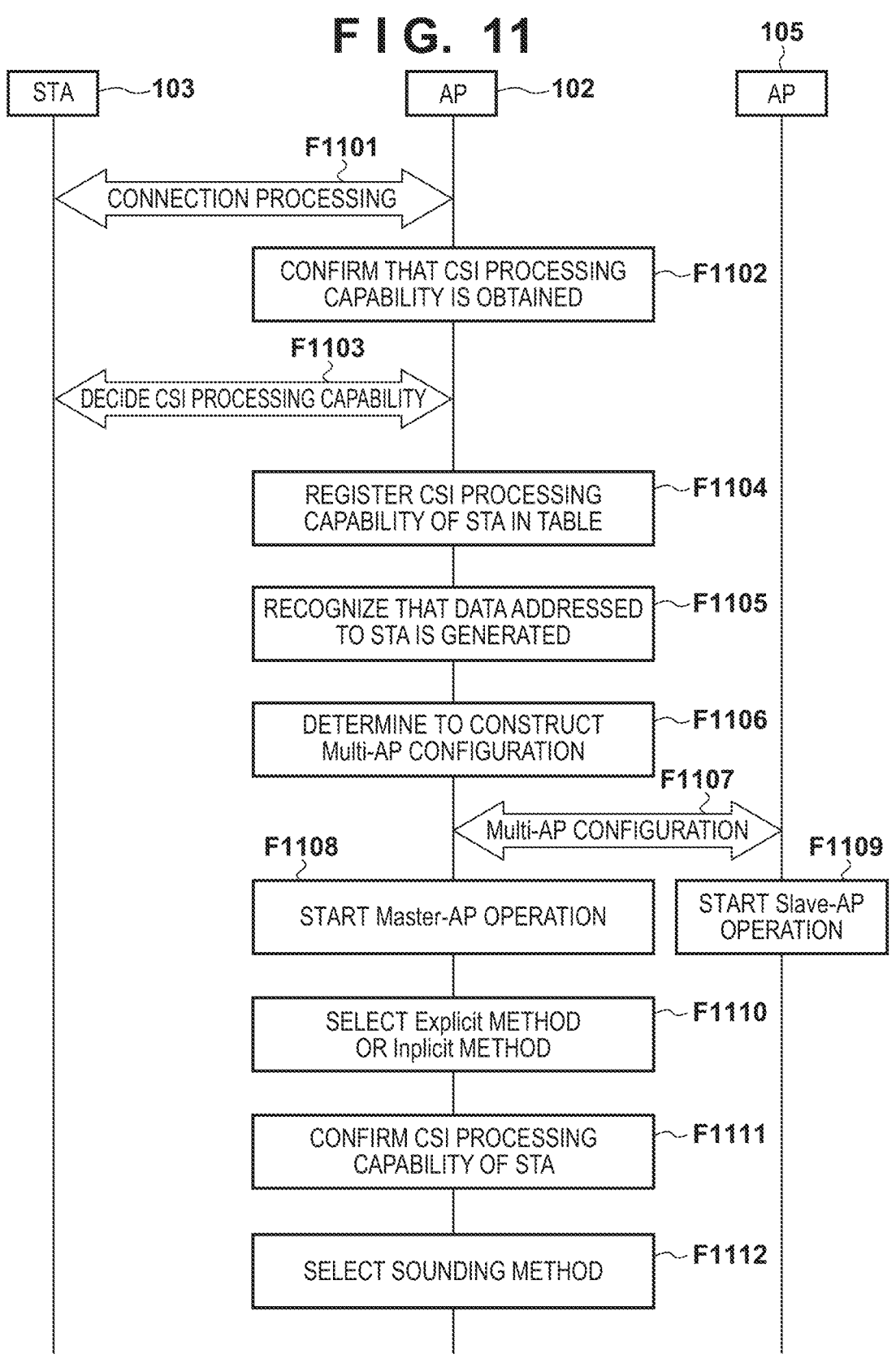

F I G. 12
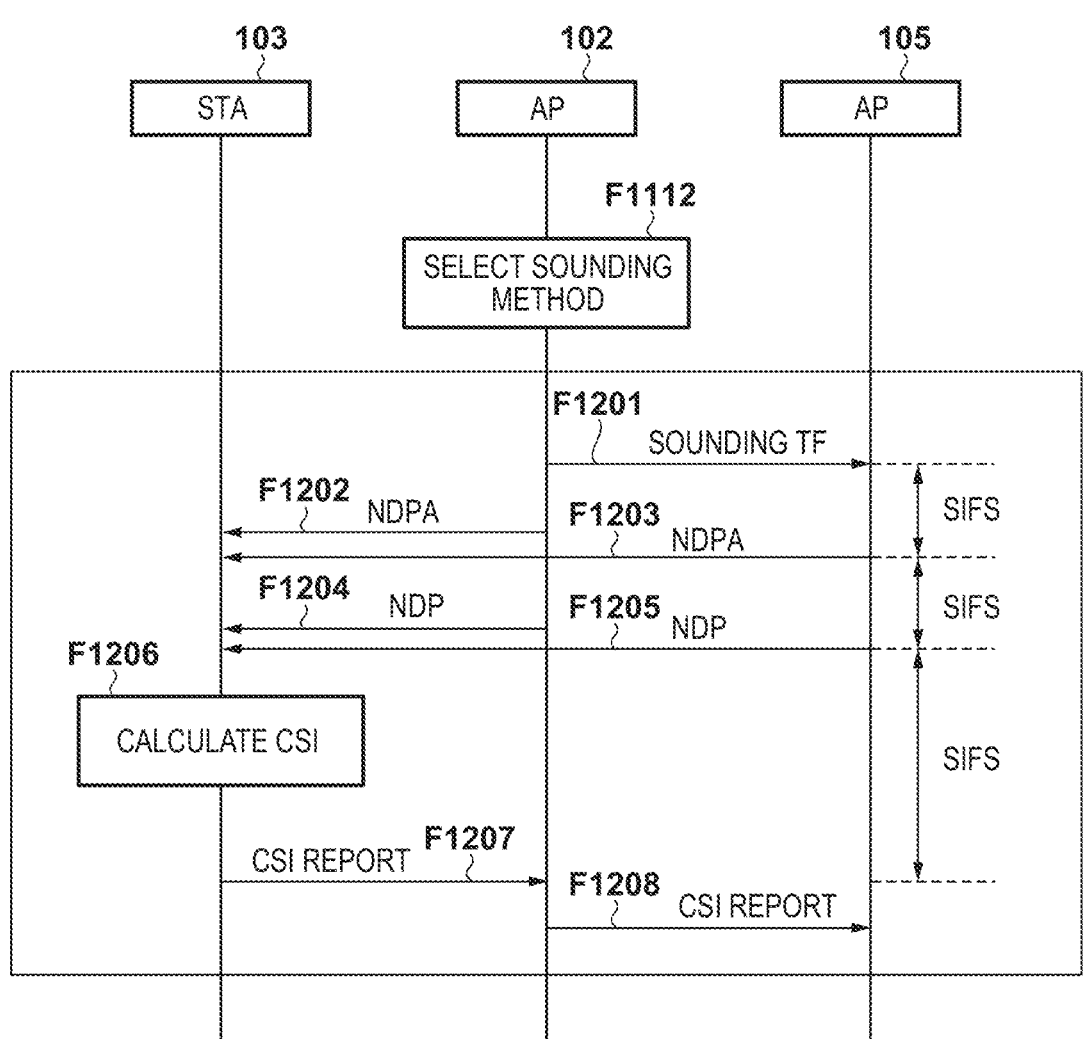

F I G. 13
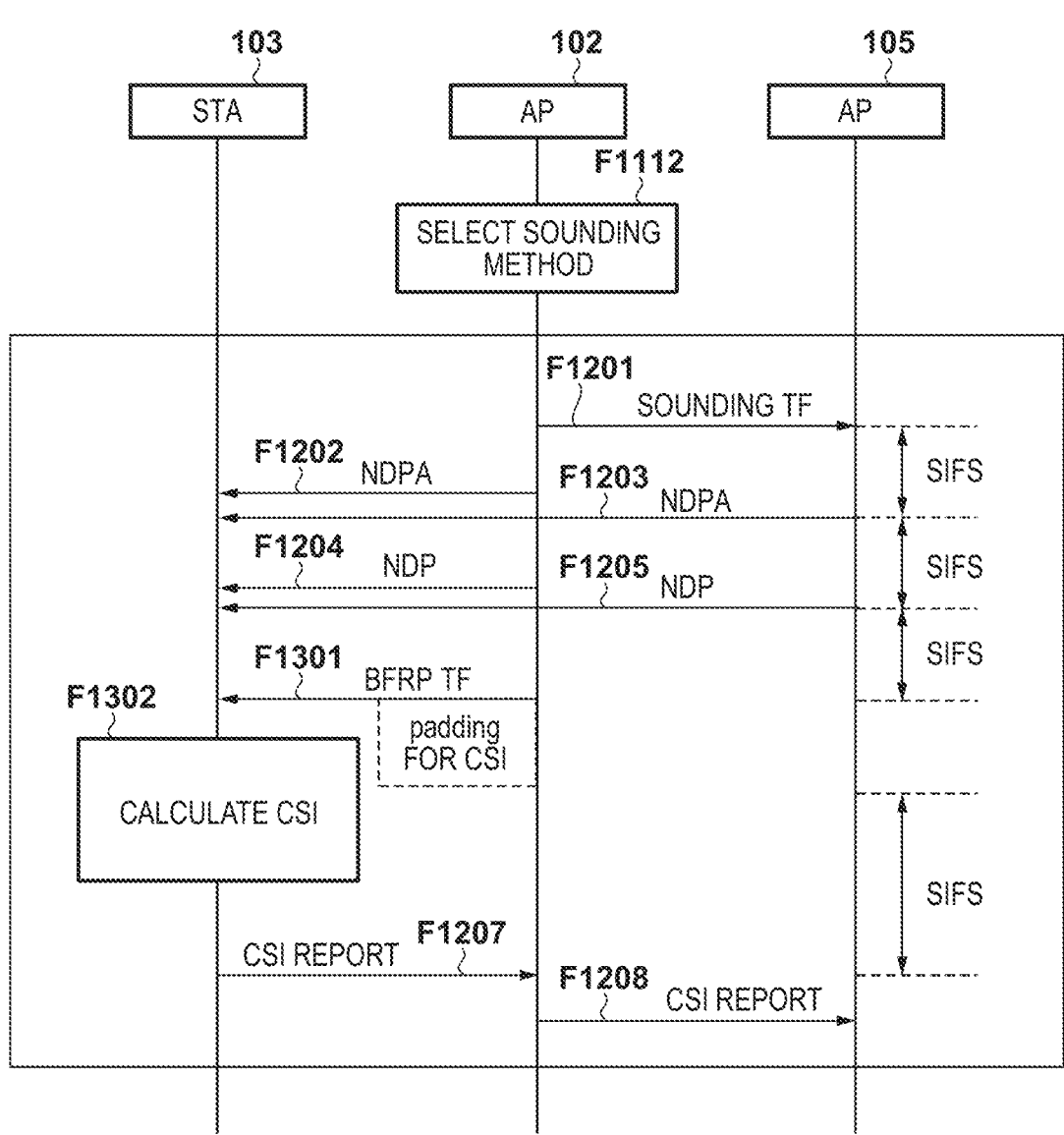

F I G. 14
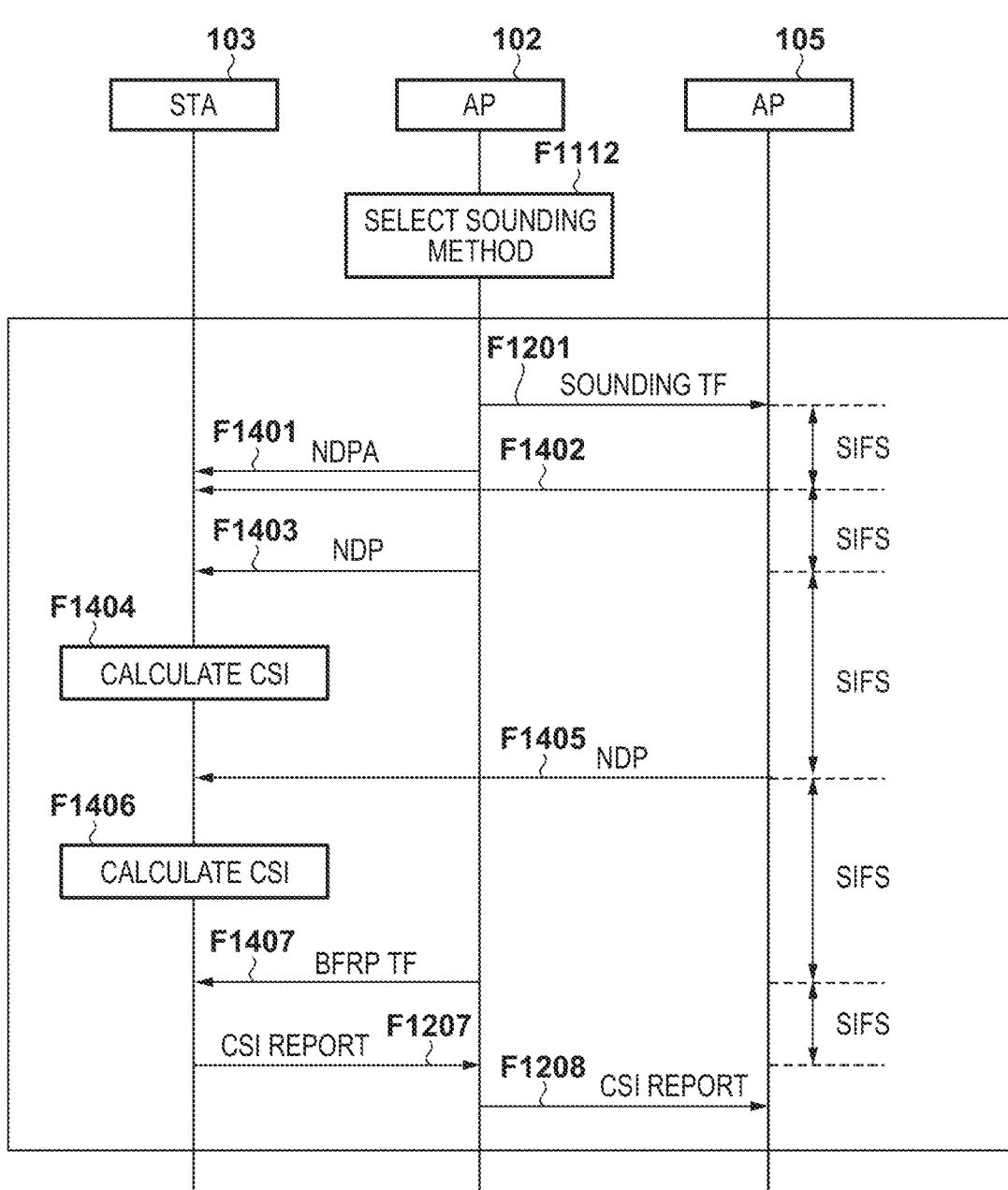

1

COMMUNICATION APPARATUS, METHOD OF CONTROLLING COMMUNICATION APPARATUS, AND NON-TRANSITORY COMPUTER-READABLE STORAGE MEDIUM

CROSS REFERENCE TO RELATED APPLICATIONS

This application is a continuation of U.S. patent application Ser. No. 18/157,137, filed on Jan. 20, 2023, which is a continuation of U.S. patent application Ser. No. 17/133,713, filed on Dec. 24, 2020, which claims the benefit of and priority to Japanese Patent Application No. 2020-002435, filed Jan. 9, 2020, each of which is hereby incorporated by reference herein in their entirety.

BACKGROUND OF THE INVENTION

Field of the Invention

The present invention relates to a wireless LAN communication technology.

Description of the Related Art

An IEEE 802.11 series standard is known as a communication standard related to a wireless LAN (local area network). The IEEE 802.11ax standard uses OFDMA to achieve high peak throughput as well as improve communication speeds in congested situations. Note that OFDMA is an abbreviation for Orthogonal Frequency-Division Multiple Access.

After having been a SG (study group) called an IEEE 802.11 EHT (Extreme or Extremely High Throughput), an 802.11be TG (task group) is now active in a subsequent standard to the IEEE 802.11ax standard for further improving throughput.

A multi-AP coordination configuration in which a plurality of APs (access points) coordinate and operate is being considered as one of the measures for achieving the goal of this TG which is to improve throughput. In order to operate this multi-AP coordination configuration efficiently, it is common to perform a sounding procedure between an access point (AP) and a terminal (STA). A sounding procedure is a procedure for an STA to receive an NDP (Null Data Packet) as a "sounding packet" from a plurality of APs and to transmit a feedback packet which includes channel state information (CSI) to each AP (Japanese Patent Laid-Open No. 2016-526856).

However, in a conventional sounding procedure, a procedure for a plurality of APs to cooperate and operate to transmit a sounding frame has not been made clear. Also, in the conventional technique, in relation to time-related overhead of the sounding procedure and a heavy load on the STA, it has been proposed, mostly, to reduce the amount of CSI information (reduce the amount of feedback) transmitted by the STA. However, reducing the amount of CSI information makes the estimation of a wireless medium inaccurate, and especially, in the multi-AP coordination configuration, effects of that inaccuracy such as inefficiency in medium usage and slowdown in speed can be significant.

SUMMARY OF THE INVENTION

The present disclosure in consideration of the foregoing problems provides an efficient sounding procedure in a multi-AP coordination configuration.

According to one aspect of the present invention, there is provided a communication apparatus operable to act as a master-AP in a multi-AP (access point) coordination configuration that supports an IEEE802.11 series standard, the apparatus comprises: a selection unit configured to select a sounding method which is a method for transmitting a sounding packet for receiving a CSI report as feedback from a terminal apparatus in accordance with a CSI (channel state information) calculation capability in the terminal apparatus that is connected to the communication apparatus.

Further features of the present invention will become apparent from the following description of exemplary embodiments (with reference to the attached drawings).

BRIEF DESCRIPTION OF THE DRAWINGS

FIG. 2 illustrates an example of a hardware configuration of an AP in an embodiment.

FIG. 3A illustrates an example of an AP functional configuration in an embodiment.

FIG. 3B illustrates an example of an STA functional configuration in an embodiment.

FIG. 5 is a flowchart of processing that is executed when data to be transmitted to an STA is generated.

FIG. 6 is a flowchart of processing for selecting a sounding method.

FIG. 9 illustrates a configuration of a CSI report field.

FIG. 10 indicate configurations of a MIMO control field.

FIG. 11 is a sequence diagram "from a connection between the AP and the STA until a selection of the sounding method".

FIG. 12 is a sequence diagram "in a case of simultaneous NDP transmission (no BFRP TF)".

FIG. 13 is a sequence diagram "in a case of simultaneous NDP transmission (with BFRP TF).

FIG. 14 is a sequence diagram "in a case of sequential NDP transmission".

DESCRIPTION OF THE EMBODIMENTS

Figure 1:
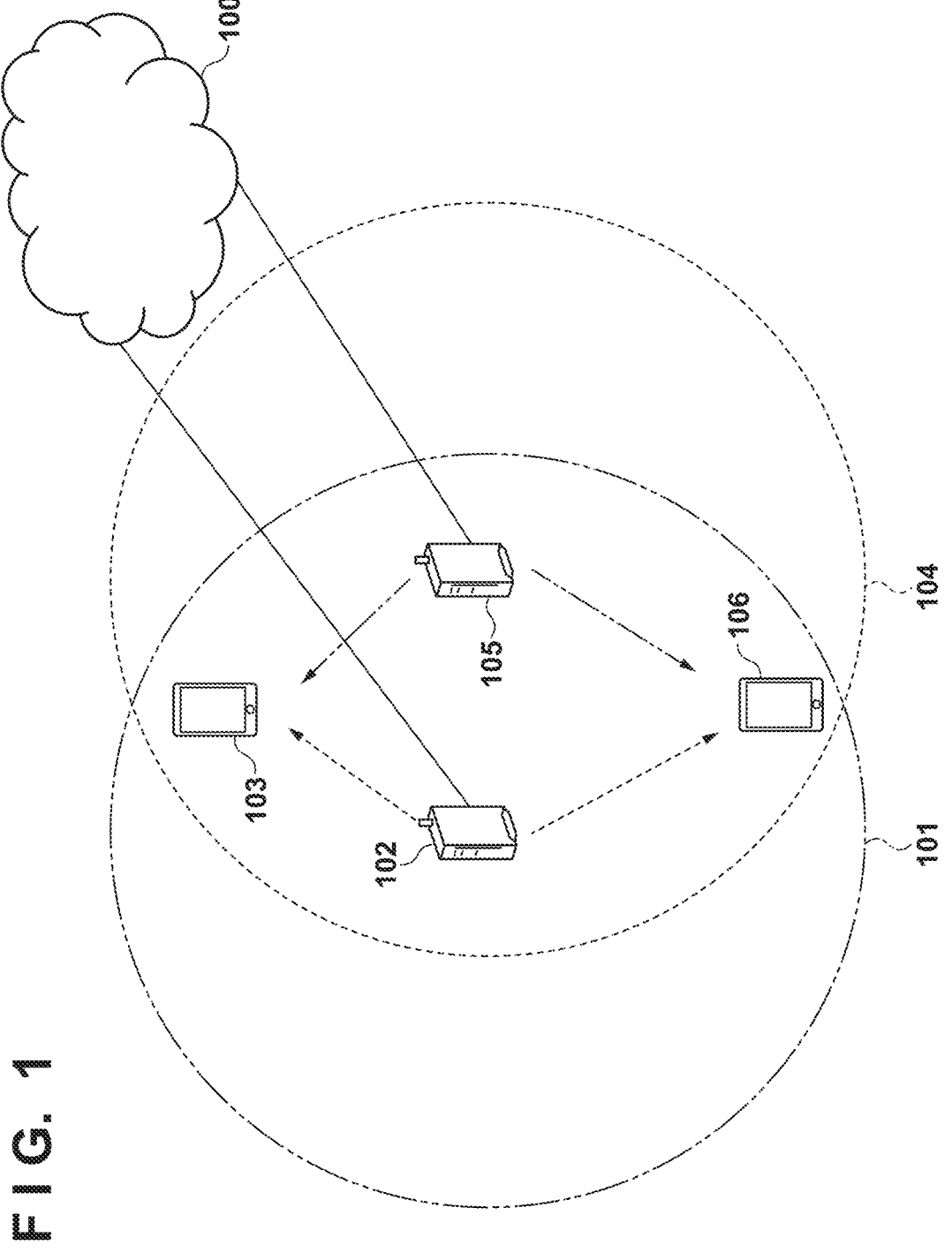
FIG. 1 illustrates an example of a system configuration in an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

[System Configuration]

FIG. 1 illustrates an example of a system configuration in this embodiment. An AP 102 and an AP 105 are access points comprising a function (multi-AP coordination function) that can achieve a multi-AP coordination configuration. A multi-AP coordination function is a function for achieving higher-speed or more stable communication in relation to a connected terminal than when there is one AP by coordination with the other APs. Here, a stable state is a state of an arbitrary combination of a good signal-noise ratio, low interference, low latency, and low jitter, for example. Note that there are various methods in techniques for achieving such a stable state. For example, a JTX (Joint Transmission) that uses a D-MIMO (Distributed Multiple Input Multiple Output); null steering; coordinated OFDMA; and fractional coordinated OFDMA can be given. The AP 102 and the AP 105, in a case where they are not executing the multi-AP coordination function, manage only a network of a BSS (Basic Service Set) 101 and a network of a BSS 104, respectively.

The AP 102 and the AP 105 are connected by a network (backhaul) 100. The network 100 is a communication means for connecting a BSS (Basic Service Set) and another network to each other when an AP constructs a DS (Distributions System). The network 100 is achieved by wired communication such as Ethernet (registered trademark) and telephone line or wireless communication such as LTE (Long-Term Evolution) and WiMAX (Worldwide Interoperability for Microwave Access). Further, the network 100 may be a wireless LAN conforming to the IEEE 802.11 series standard. In such a case, the network 100 may be the same or different from a wireless channel that is used between an AP and an STA.

An STA 103 and an STA 106 are wireless LAN terminals. These STAs are capable of data communication with a plurality of APs. Data communication includes communication in the above-described sounding procedure. Specifically, reception of an NDPA (NDP Announcement) and an NDP, transmission of a frame including a CSI Report field, and reception of an NFRP TF (NDP Feedback Report Poll Trigger Frame).

[Configuration of Communication Apparatuses (AP, STA)]

In FIG. 2, an example of a hardware configuration of APs (AP 102, AP 105) in the present embodiment is illustrated. An AP has, as an example of its hardware configuration, a storage unit 201, a control unit 202, a functional unit 203, an input unit 204, an output unit 205, a communication unit 206, and an antenna 207. The storage unit 201 is configured by a memory such as a ROM or a RAM, and stores various information such as a program for performing various operations which will be described later, communication parameters for wireless communication, and the like. Note that as the storage unit 201, a storage medium such as a floppy disk, a hard disk, an optical disk, a magneto-optical disk, a CD-ROM, a CD-R, a magnetic tape, a nonvolatile memory card, a DVD, and the like may be used in addition to a memory such as a ROM or a RAM. The storage unit 201 may include a plurality of memories and the like.

The control unit 202 is configured by one or more processors such as CPUs and MPUs, an ASIC (application specific integrated circuit), a DSP (digital signal processor), an FPGA (field-programmable gate array), and the like, for example. Here CPU is an acronym for Central Processing Unit and MPU is an acronym for Micro Processing Unit. The control unit 202 controls the AP by executing a program that is stored in the storage unit 201. Note that a configuration may be taken such that the control unit 202 controls the AP by a program and an OS (Operating System) that are stored in the storage unit 201 cooperating. Also, a configuration may be taken such that the control unit 202 is made up of a plurality of processors such as a multi-core system and controls the AP. The control unit 202 may control the functional unit 203 to execute a predetermined process such as an AP function, imaging, printing, and projection. The functional unit 203 is hardware for the AP to execute predetermined processing.

The input unit 204 accepts various operations from a user. The output unit 205 performs various kinds of outputs for the user. Here, an output by the output unit 205 includes at least one of a display on a screen, a sound output by a speaker, a vibration output, and the like. Note that both the input unit 204 and the output unit 205 may be implemented by a single module, such as a touch panel.

The communication unit 206 performs control of wireless communication conforming to the IEEE 802.11 series standard, control of wireless communication conforming to Wi-Fi (registered trademark), and control of IP (Internet Protocol) communication. Further, the communication unit 206 controls the antenna 207 to transmit and receive wireless signals for wireless communication. The antenna 207 supports communication for the multi-AP coordination configuration. For example, in the AP, a D-MIMO (Distributed Multiple Input Multiple Output) transmission for a JTX (Joint Transmission) is possible. There may be plural antennas 207, although only one is denoted for simplicity in the figure. Generally, the number of antennas 207 (elements) is a number according to the number of streams. Also, a frequency band that is supported by the antenna 207, in addition to 2.4 and 5 GHz bands, is a 6 GHz band that is scheduled to be introduced from 802.11ax.

Note that the STAs (STA 103, STA 106) also have the same hardware configuration as the AP illustrated in FIG. 2. In such a case, the control unit 202 can execute predetermined processing such as an STA function by controlling the functional unit 203.

In FIG. 3A, an example of a functional configuration of the AP is illustrated. As an example of the functional configuration of the AP, the AP has a communication control unit 301, a CSI processing capability setting unit 302, a storage management unit 303, a UI (user interface) control unit 304, a multi-AP configuration control unit 305, a sounding method decision unit 306, and a sounding processing unit 307. The communication control unit 301 performs control for performing transmission/reception of a wireless signal to and from another wireless LAN apparatus (for example, another AP or STA) via the communication unit 206. The communication control unit 301 executes wireless LAN communication control such as reception of a wireless frame from another wireless LAN apparatus, frame generation, and frame transmission in accordance with the IEEE 802.11 standard series. The CSI processing capability setting unit 302 sets (the value of) the CSI processing capability of the STA based on information that is exchanged with the STA and the like. The storage management unit 303 performs storage control/management that is related to the storage unit 201. The UI control unit 304 delivers to each configuration element a control signal according to an input operation to the input unit 204 by the user (not shown). The multi-AP configuration control unit 305 executes a multi-AP configuration function by selecting a multi-AP configuration method in accordance with the presence of a peripheral AP, the capability of the peripheral AP, and a connection state between the peripheral AP and the STA. The sounding method decision unit 306 decides whether to perform sounding processing by either an explicit method or an implicit method which will be described below. The sounding processing unit 307 performs sounding processing in accordance with a method that is decided by the sounding method decision unit 306. In the present embodiment, sounding processing is performed based on the CSI processing capability of the STA.

In FIG. 3B, an example of a functional configuration of the STA is illustrated. The STA, as an example of its functional configuration, has a communication control unit 311, a UI control unit 312, a CSI processing capability decision unit 313, and a CSI calculation unit 314. The communication control unit 311 and the UI control unit 312 are the same as the communication control unit 301 and the UI control unit 304. The CSI processing capability decision unit 313 decides the CSI processing capability of the STA itself. The CSI calculation unit 314 performs CSI calculation processing.

[Processing Flow]

Next, a processing flow of the AP having the above configuration will be described with reference to the figures. The processing indicated below may be started when a BSS is started or at a desired timing during BSS operation by the AP.

<Connection Processing Between AP and STA>

Figure 4:
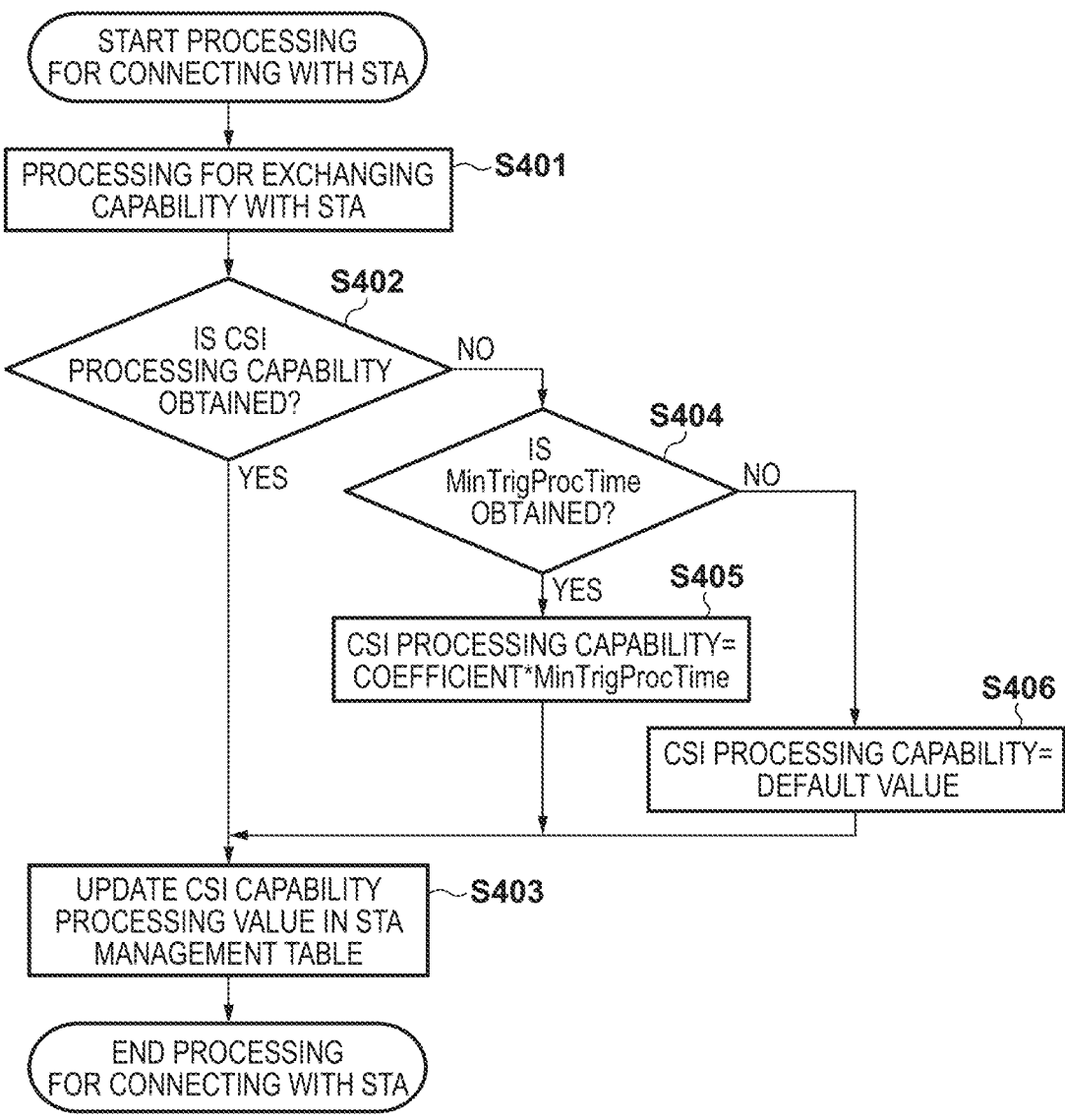
FIG. 4 is a flowchart of processing that is executed when a connection with an STA is started.

FIG. 4 is a flowchart of processing that is executed when a connection between the AP 102 and the STA 103 is started. In step S401, the communication control unit 301 of the AP 102, when connecting with the STA 103, exchanges capability information and operation information therewith. This is achieved by exchanging a Management frame that includes an information element (IE). The information element has been newly defined in response to the progress in IEEE802.11 standardization. For example, it is an HT Capability element in IEEE 802.11n, a VHT Capability element in IEEE 802.11ac, an HE Capabilities element in IEEE 802.11ax, and an EHT Capabilities element in IEEE 802.11be. Note that HT is an acronym for High Throughput, VHT is an acronym for Very High Throughput, HE is an acronym for High Efficiency, and EHT is an acronym for Extremely High Throughput. Also, a Management frame is a MAC (Medium Access Control) frame such as a Beacon, a Probe Request/Response, an Association Request/Response, and an Authentication Request/Response. The multi-AP coordination function is a function that is introduced by the IEEE 802.11be standard. Accordingly, capability information that is related to the function is included in an EHT Capabilities element.

Figure 7:
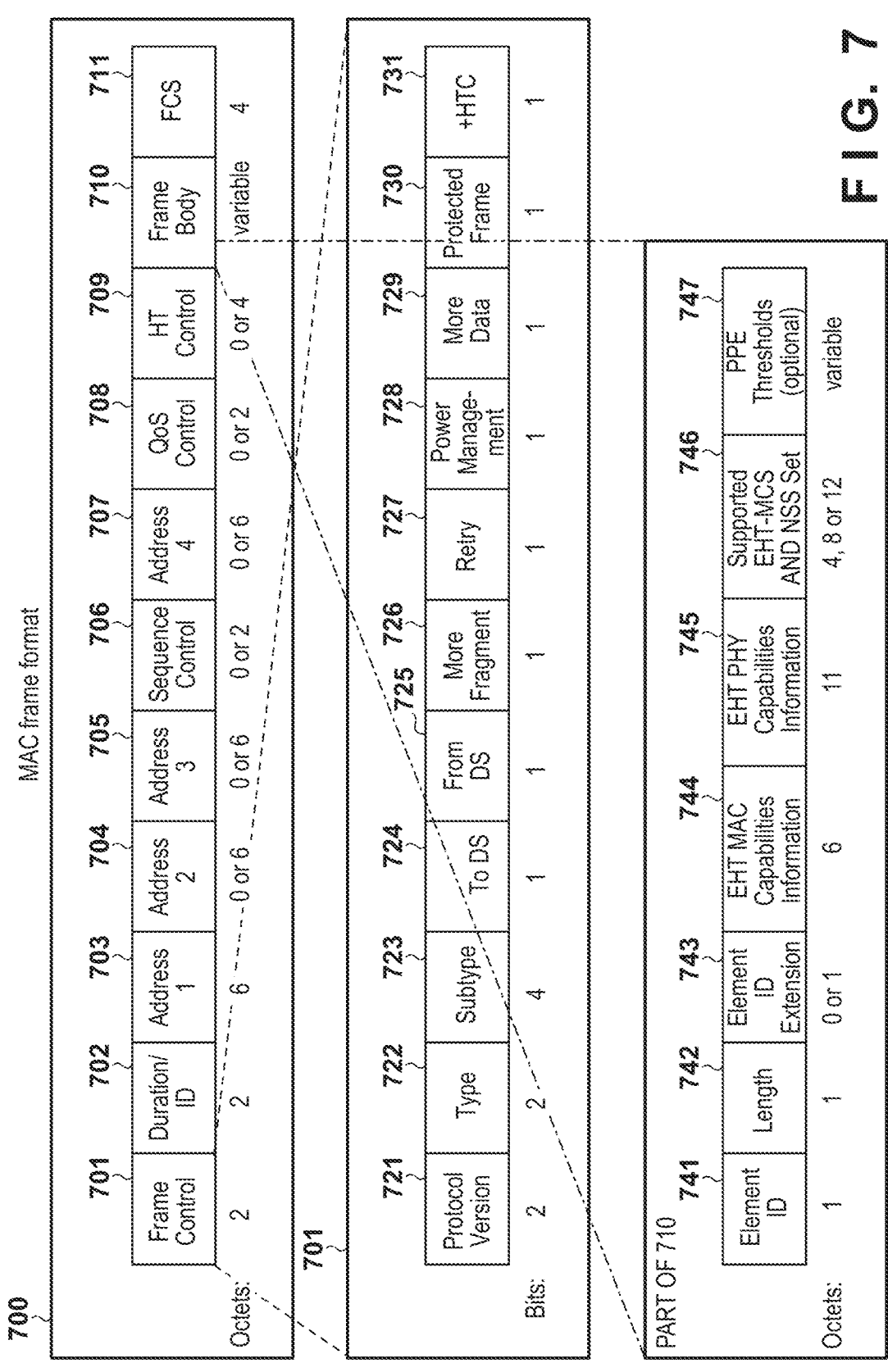
FIG. 7 illustrates a configuration of a MAC frame.

In FIG. 7, a MAC frame configuration that is specified by the IEEE802.11 standard is indicated. In a MAC frame 700, various fields are included. In Frame Control 701, subfields 721 to 731 are included. In the information element (IE) of a Frame Body 710, subfields 741 to 747 are included. In an Address1 703, an Address2 704, an Address3 705, an Address 707, addresses such as a BSSID, a transmission source, and a destination are set in accordance with a MAC frame type (Type 722). Also, in the MAC frame 700, a Duration/ID 702, Sequence Control 706, QoS Control 708, and an FCS (Frame Check Sequence) 711 are included; however, detailed description will be omitted.

HT Control 709 is specified as follows by the IEEE 802.11ax standard. That is, when the left-most bit is 0, the HT Control 709 is for HT (IEEE 802.11n); when the left-most 2 bits are 10, the HT Control 709 is for VHT (IEEE 802.11ac); and when the left-most 2 bits are 11, the HT Control 709 is for HE (IEEE 802.11ax). Note that the definition of the HT Control 709 for EHT (IEEE 802.11be) is unspecified.

In the Frame Control 701, a Protocol Version 721 is a 2-bit number which indicates a protocol version, and in a case of an IEEE 802.11 frame, is "0". The Type 722 is a 2-bit number which indicates the type of the frame and indicates one of Management, Control, or Data. The Subtype 723 is a 1-bit number which indicates the subtype of the frame and indicates one of Management, Control, or Data. To DS 724 indicates that the destination of the frame is a DS (Distribution System). Also, in the Frame Control 701, From DS 725, More Fragment 726, Retry 727, Power Management

728, More Data 729, Protected Frame 730, and +HTC 731 are included; however, detailed description will be omitted.

In the Frame Body 710, the subfields 741 to 747 are the configuration of the EHT Capabilities element for IEEE 802.11be. In an Element ID 741, a value that is related to the EHT of IEEE 802.11be follows a value of the HE Capabilities element of IEEE 802.11ax and is 255. A Length 742 is the length of an information element. In an Element ID Extension 743, an EHT Capabilities element that is related to capability information or an EHT Operation element that is related to operation information is defined. EHT MAC Capabilities Information 744, EHT PHY Capabilities Information 745, a Supported EHT-MCS And NSS Set 746, and PPE (Physical layer Packet Extension) Thresholds 747 are the same configuration as in a case of IEEE 802.11ax (the HE Capabilities element).

In the present embodiment, a subfield (CSI processing capability subfield) that indicates a capability (CSI processing capability/CSI calculation capability) for calculating the CSI by the STA in the EHT MAC Capabilities Information 744 is defined. The CSI processing capability may be decided by the CSI processing capability decision unit 313 in the STA. The first example that is related to the CSI processing capability subfield is a 1-bit number that indicates whether the CSI processing capability is "high" or "low". The second example that is related to the CSI processing capability subfield is a 1-bit number that indicates whether it is "capable" or "not capable of responding within an SIFS (Short Inter Frame Space) to a plurality of sounding packets". The third example that is related to the CSI processing capability subfield is a time conversion value that is calculated from an equation consisting of "the number of transmission/reception antennas" and "the number of streams" of the AP and the STA and a "desired coefficient". In such a case, the present invention is not limited to a 1-bit number. That is, it may be two or more values. The fourth example that is related to the CSI processing capability subfield is a value that is the same as the expression format of the processing capability of the CPU. In such a case, the present invention is not limited to a 1-bit number.

Note that a means for notifying the CSI processing capability is not limited to the above-described CSI processing capability subfield. As another example, a configuration may be taken so that the HE Capabilities element is used instead of the EHT Capabilities element. In such a case, a capability expression value will be a 1-bit number. This restriction of a 1-bit number is due to the fact that what is Reserved in the 48 bit HE Capabilities element of the IEEE 802.11ax standard is 1 bit.

Yet another example for notifying the CSI processing capability is a method of newly defining an Action frame of the IEEE802.11 standard and then using it. In such a case, the expression of the capability of information to be notified can be a desired number of bits.

Returning to the description of FIG. 4, in step S401, the communication control unit 301 of the AP 102 exchanges capability information and the like with the STA 103, and then in step S402, the CSI processing capability setting unit 302 of the AP 102 determines whether the CSI processing capability of the STA 103 is obtained. If the CSI processing capability of the STA 103 is obtained (Yes in step S402), the processing proceeds to step S403. In step S403, the storage management unit 303 sets to an STA management table a value that indicates the obtained CSI processing capability. Here, the STA management table is a region that holds the capability information and the state of the STA that are to be necessary when the AP manages the BSS (Basic Service Set)

and is present within the storage unit 201. If the CSI processing capability of the STA 103 is not obtained in step S402 (No in step S402), the processing proceeds to step S404. In step S404, the CSI processing capability setting unit 302 of the AP 102 determines whether the MinTrigProc-Time of the STA 103 is obtained. In a case where the MinTrigProcTime of the STA 103 is obtained (Yes in step S404), the processing proceeds to step S405. The determination in step S404 is intended to confirm that an index to be in place of a value that indicates the CSI processing capability itself is obtained.

Here, a value that is indicated by MinTrigProcTime will be described. This value corresponds to the value of a Trigger Frame MAC Padding Duration of the HE MAC Capabilities Information of IEEE 802.11ax. This subfield is a 2-bit number, and 0/1/2 respectively correspond to 0 (zero) μsec/8 μsec/16 μsec of MinTrigProcTime. Note that the name MinTrigProcTime originates from "a minimum value of preparation time for performing a transmission using an RU (Resource Unit) that is assigned by a Trigger Frame (TF)".

Figure 8:
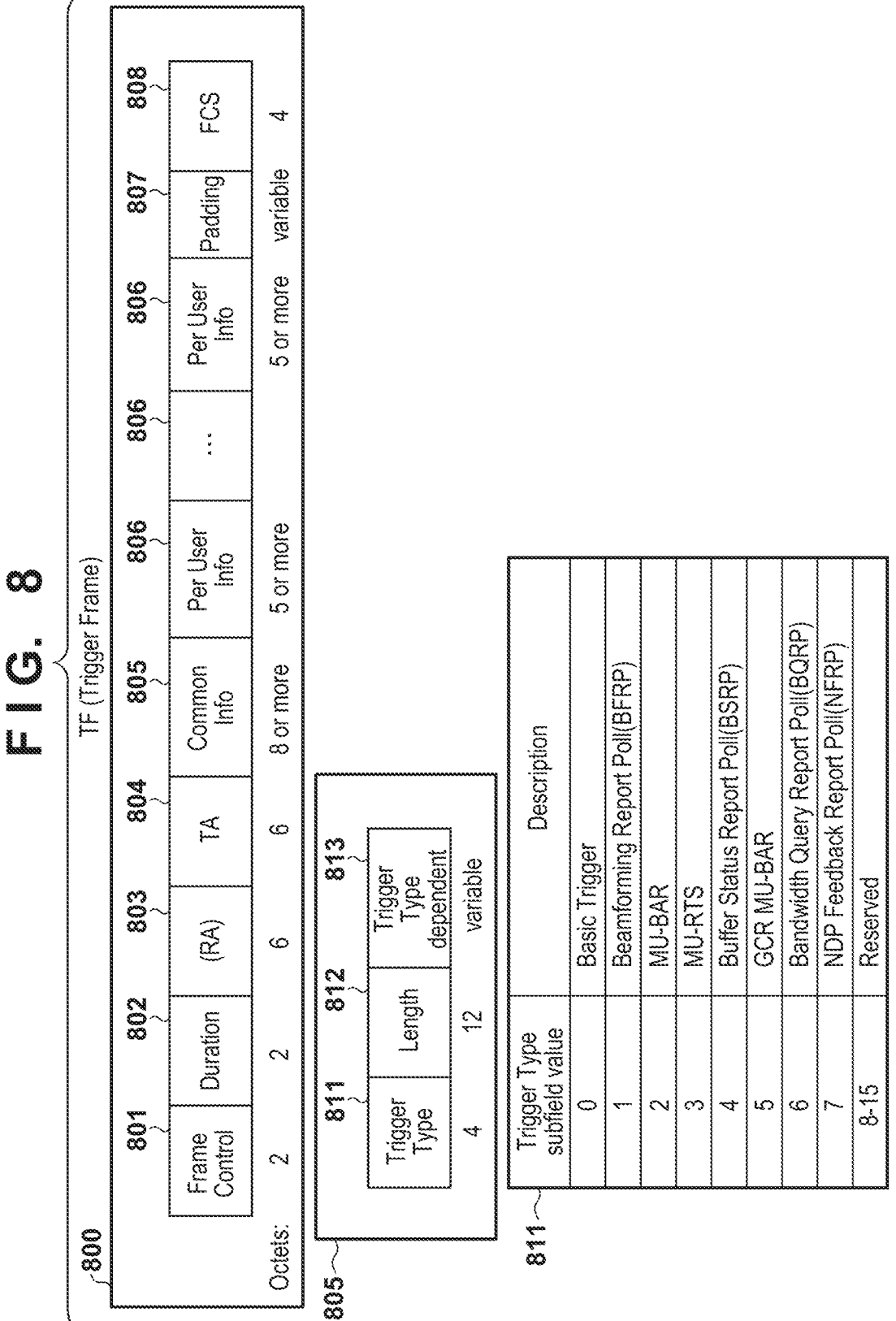
FIG. 8 indicates a configuration of a trigger frame (TF).

In FIG. 8, a configuration of a trigger frame (TF) is illustrated. A trigger frame is a frame to be newly introduced from IEEE802.11ax and is a frame for indicating an activation timing necessary for a plurality of STAs (users) to simultaneously transmit a frame, and the AP wireless channel information for using the frame, and the like. In Trigger Frame 800 of FIG. 8, various fields are included. Frame Control 801 is a common field in the IEEE802.11 series and in the present embodiment, a value that indicates that the field is a trigger frame of IEEE 802.11ax is entered. Common Info 805 indicates information that is common across the plurality of STAs (terminals) which are the destinations of this trigger frame and includes subfields 811 to 813. Per User Info 806 indicates individual information that is related to the destination of this trigger frame. Padding 807 is something for providing a temporal postponement to a group of STAs that received this trigger frame. The AP decides from the MinTrigProcTime of each STA the temporal postponement (that is, the length of the padding 807). Generally, the length (value) of the padding that corresponds to the maximum value of the MinTrigProcTime among the MinTrigProcTimes of a group of STAs to be the destination of the trigger frame is used. Also, in the Trigger Frame 800, a Duration 802, an RA (Receiver Address) 803, a TA (Transmitter Address) 804, and a FCS (Frame Check Sequence) 808 are included; however, detailed description is omitted.

In the Common Info 805, a value (Trigger Type subfield value) that is indicated by a Trigger Type 811 and description that corresponds to the value are indicated in a table at the bottom of FIG. 8. For example, in a case where the Trigger Type 811 is 7, the Trigger Type 811 indicates an NFRP (NDP Feedback Report Poll) TF. Also, in the Common Info 805, a Length 812 and a Trigger Type Dependent 813 are included; however, detailed description is omitted.

Once again, returning to the description of FIG. 4, in step S405, the CSI processing capability setting unit 302 of the AP 102 sets to the value of the CSI processing capability the value to which the MinTrigProcTime is multiplied by a predetermined coefficient, and then the processing proceeds to step S403. Note that, a configuration may be taken so as to subtract a predetermined constant in place of multiplying (multiplication) the MinTrigProcTime by a predetermined coefficient. In any case, the MinTrigProcTime is handled as something whose CSI capability is higher the smaller its value.

In step S404, in a case where MinTrigProcTime of the STA 103 is not obtained (No in step S404), the processing proceeds to step S406. In step S406, the CSI processing capability setting unit 302 of the AP 102 sets to a default value the value of the CSI processing capability. For example, this default value is a value that in a case of a 1-bit number, means "low" or "unable to respond within an SIFS to a plurality of sounding packets". As described above, the reason why the CSI processing capability of the STA whose CSI processing capability is unknown is estimated to be low is for reliably executing irrespective of the capability of the STA the processing to be necessary thereafter.

Note that in a case where the STA 103 does not notify the CSI processing capability to the AP 102 in step S401, an inquiry for the CSI processing capability may be made to the STA 103 from the AP 102 in step S402.

<Data Generation to STA>

FIG. 5 is a flowchart of processing that is executed when data to be transmitted to the STA 103 is generated in the AP 102. The data is data that is addressed to the STA 103 from the STA 106, data that is addressed to the STA 103 from an STA (not shown) within the BSS, data that is addressed to the STA 103 from a terminal on the network 100, data that is addressed to the STA 103 from the AP 102, and the like.

In step S501, the communication control unit 301 of the AP 102 determines whether to transmit the generated data by a multi-AP coordination configuration. In a case where data is transmitted by the multi-AP coordination configuration (Yes in step S501), the processing proceeds to step S502. In step S502, the multi-AP configuration control unit 305 of the AP 102 executes the multi-AP coordination function with an AP in the vicinity. Next, in step S503, the AP 102, as a result of the execution of the multi-AP coordination function, determines whether to operate as a Master-AP or a Slave-AP of the multi-AP coordination configuration. Here, a Master-AP is an AP that manages the multi-AP coordination configuration, and a Slave-AP is an AP that operates under the control of the Master-AP. In a case where the AP 102 operates as the Master-AP (Yes in step S503), the processing proceeds to step S507. The processing in step S507 will be described later using FIG. 6. In a case where the AP 102 operates as the Slave-AP (No in step S503), the processing proceeds to step S506.

The case of No in step S503 in the present embodiment corresponds to a case where the AP 102 is the Slave-AP and the AP 105 is the Master-AP. In step S506, the communication control unit 301 of the AP 102 transmits the CSI processing capability of the STA 103 in relation to the Master-AP (that is, the AP 105). In the following step S508, the sounding processing unit 307 of the AP 102 performs the sounding processing of the Slave-AP.

In step S501, in a case where data is not transmitted by the multi-AP coordination configuration, the processing proceeds to step S505, and the AP 102 performs Single-AP transmission processing. Regarding this Single-AP transmission processing, there is no characteristic operation of the present invention; therefore, description will be omitted.

Note that in the present embodiment, a case where the AP 102 that has performed the connection processing with the STA 103 is the Master-AP is assumed; however, the AP 102 may execute a multi-AP coordination configuration function in relation to the STA 106 that has performed the connection processing with the Slave-AP (AP 105). In such a case, the AP 102 will perform processing for receiving information to be transmitted by the processing in step S506 from the AP 105 following the processing in step S503.

<Selection of Sounding Method by Master-AP>

Next, processing in step S507 in FIG. 5 will be described with reference to FIG. 6. In step S601, the sounding method decision unit 306 of the AP 102 performs a selection of whether to perform the sounding processing by an explicit method or an implicit method. The selection can be performed based on the capability information that is exchanged to and from the STA 103, the input information for the input unit 204 by the user, a predetermined setting, and the like.

Here, the explicit method and the implicit method will be described. In the explicit method, first, the AP (beamformer) transmits the NDP (Null Data Packet) as a sounding packet. The STA (beamformee) that receives the NDP calculates the CSI from the NDP and then feeds back the CSI to the AP. By this, the AP estimates a reception condition in the STA of a packet that it transmits.

In the implicit method, first, the STA transmits the NDP as a sounding packet, and the AP that received the NDP estimates the situation of the STA from the reception state of the packet. As described above, in the implicit method, the STA only needs to transmit the NDP at an assigned timing and the processing load in the STA is lesser in comparison to the explicit method for not needing the processing for calculating the CSI. Accordingly, in a case where the implicit method is selected in step S601 (No in step S601), the problem of an increase in the processing load in the STA does not occur. Therefore, description of the processing of the implicit method (step S607) will be omitted.

In a case where the explicit method is selected in step S601 (Yes in step S601), the processing proceeds to step S602. In step S602, the following processing branches in accordance with the value of the CSI processing capability of the STA 103. Note that in a case where the value registered in the STA management table in the processing in step S403 in FIG. 4 is a 1-bit number, the value is made to correspond to "high" or "low". That is, in a case where the value of the CSI processing capability is indicated by two values which express the two levels "high" and "low", the processing branches to step S603 or S606. In a case where the resolution of the registered value is greater than 1 bit, the value is made to correspond to "high", "medium", or "low". That is, in a case where the value of the CSI calculation capability is indicated by three values which express the three levels "high", "medium", and "low", the processing branches to step S603, step S604, or step S606.

In a case where the CSI processing capability is "high", the processing proceeds to step S603. In step S603, the AP 102 performs "simultaneous NDP transmission (No BFRP TF (BeamForming Report Poll Trigger Frame)) processing". In a case where the CSI processing capability is "medium", the processing proceeds to step S604. In step S604, the AP 102 decides the length (time) of the padding in BFRP TF. This decision processing is processing in which the larger the CSI processing capability is in relation to the CSI processing capability that is classified in the same "medium" level, the shorter the padding time for CSI. Next, in step S605, the AP 102 performs "simultaneous NDP transmission (with BFRP TF) processing". In a case where the CSI processing capability is "low", the processing proceeds to step S606. In step S606, the AP 102 performs "sequential NDP transmission processing". The details of the processing of steps S603, S605, and S606 will be described later using FIGS. 12 to 14, respectively. After the sounding processing (one of steps S603, S605, and S606), the data transmission processing is performed (step S608).

<Calculation of CSI>

Next, a CSI report field in a CSI frame to be generated (calculated) and then transmitted by the STA will be described with reference to FIG. 9. FIG. 9 illustrates a configuration of a CSI report field. A CSI frame is an Action frame whose category is an HT or an Action No Ack frame in the IEEE802.11 standard, for example. This CSI frame is something for notifying Channel State Information to a beamformer. Note that an Action frame is a frame whose Type 722 holds a value 00 and whose Subtype 723 holds a value 1101 in FIG. 7.

In FIG. 9, an SNR in receive chain 1 901 is an 8-bit number and is a signal-to-noise ratio (SN) of a receive chain of the STA that transmits a CSI report. Here, a receive chain is an object that performs the necessary signal processing that is related to the received data. In this signal processing, filtering, amplification, downconversion, and sampling are included. A CSI Matrix for carrier 902 is a matrix that is derived from a CHAN_MAT of an RXVECTOR. Here, the RXVECTOR is a set of parameters that are related to the reception of a physical layer of an 802.11 frame, and the CHAN_MAT is one of those parameters. By this CHAN_MAT, whether that frame includes CSI matrices or beamforming feedback matrices is indicated. Note that, FIG. 9 is a configuration of the CSI report field in a case where the operation frequency band is 20 MHz; however, in a case where the operation frequency band is 40 MHz, the CSI Matrix for carrier 902 is "from −58 to −2" and "from 2 to 58". Further, Nb, Nc, and Nr in FIG. 9 are values that are assigned by the MIMO control field. Here, the MIMO control field is used for exchanging channel state information or for managing the transmission of beamforming feedback information.

A configuration 10a and a configuration 10b in FIG. 10 are respectively configurations of a MIMO control field before IEEE 802.11ax and of IEEE 802.11ax. Note that, the MIMO control field of IEEE 802.11ax is assumed to be used also in IEEE 802.11be. Here, the Nb is a number defined by a Coefficient Size field 1003 of the MIMO control field. The Nc is a number of columns in the CSI Matrix defined by an Nc Index field 1001 of the MIMO control field. The Nr is a number of rows in the CSI Matrix defined by an Nr Index field 1002 of the MIMO control field.

Incidentally, a plurality of APs simultaneously transmitting a sounding packet (NDP) by the multi-AP coordination configuration, for the receiving side, corresponds to an increase in antennas of the transmitting side. Here, the computation amount of CSI matrices increases in accordance with the number of transmission antennas; therefore, in the simultaneous NDP transmission, the computation amount of CSI matrices increases in comparison to a method in which each NDP is sequentially transmitted. Accordingly, in a case of executing a simultaneous NDP transmission method, in order to perform CSI report feedback that is related to an NDP within the SIFS time, the processing capability per unit of time in the STA must be higher than the processing capability per unit of time that is related to the sequential method.

Considering this point, in the present embodiment, as in the branch in step S602 in FIG. 6, the AP 102 changes the sounding processing in accordance with the processing capability of the STA 103. By this, the CSI report feedback that is related to all NDPs is caused to be completed in a period based on a predetermined time (for example, SIFS).

<Sequence Diagram>

Next, the operation sequence of the AP 102 and the STA 103 will be described with reference to FIGS. 11 to 14. FIG. 11 is a sequence diagram "from a connection between the AP and the STA until a selection of the sounding method". In F1101, connection processing is performed between the AP 102 and the STA 103 (step S401). This connection processing corresponds to the exchange of a Management frame such as a Probe Request/Response, an Association Request/Response, and an Authentication Request/Response frame. In F1102, the AP 102 confirms whether the CSI processing capability of the STA 103 is obtained (step S402). In F1103, the AP 102 decides the CSI processing capability of the STA 103. In this processing, a calculation of the CSI processing capability from the MinTrigProcTime, a request for the CSI processing capability in a case where it has not been obtained, a setting of the CSI processing capability to a default value, and the like are included (step S404 to S406). In F1104, the AP 102 registers the CSI processing capability in the STA management table (step S403). In F1105, the AP 102 recognizes that data addressed to the STA 103 is generated. In F1106, the AP 102 determines whether to construct the multi-AP coordination configuration and then transmit data (step S501). In F1107, the multi-AP coordination function is executed between the AP 102 and the AP 105 and the multi-AP coordination configuration is constructed (step S502). In the present example, it is assumed that the AP 102 is the Master-AP. In F1108, the AP 102 starts an operation as the Master-AP. In F1109, the AP 105 starts an operation as the Slave-AP. In F1110, the AP 102 that is the Master-AP performs a determination for selecting the explicit method or the implicit method as the sounding method (step S601). In the present example, it is assumed that the explicit method is selected. In F1111, the AP 102 confirms the CSI processing capability of the STA 103 (step S602). This is performed by referencing the STA management table. In F1112, the AP 102 selects the sounding method by the CSI processing capability of the STA 103 (step S602).

Next, the operation sequence of the AP 102 and the STA 103 in each sounding method selected in F1112 will be described with reference to FIG. 12 to FIG. 14.

<Simultaneous NDP Transmission (No BFRP TF)>

FIG. 12 is a sequence in which the CSI processing capability of the STA 103 is determined to be "high" ("high" in step S602) and the sounding method that is selected in F1112 in FIG. 11 is "a case of a simultaneous NDP transmission (No BFRP TF)" (step S603). In F1201, a sounding TF is transmitted to the AP 105 from the AP 102. This sounding TF is a frame that is used by the Master-AP and the Slave-AP for simultaneously transmitting a NDP. A sounding TF is transmitted to the Slave-AP from the Master-AP. This sounding TF does not exist in the IEEE 802.11ax standard but can be achieved by a frame of the same format as the Trigger Frame 800 in FIG. 8. In such a case, the value of the Trigger Type 811 is any one of "8" to "15" that is reserved. In F1202, the AP 102 transmits an NDPA (NDP Announcement) to the STA 103. This NDPA includes an STA Info List of terminals that are to receive an NDP. This individual STA Info List is configured by a 12-bit format Association ID (AID 12) and a Feedback Type that indicates whether the user is an SU (Single User) or an MU (Multi User), and an Nc Index. In F1203, the AP 105 transmits the NDPA to the STA 103. Here, F1202 and F1203 are performed after the SIFS has elapsed from F1201. In F1204, the AP 102 transmits an NDP to the STA 103. In F1205, the AP 105 transmits an NDP to the STA 103. Here, F1204 and F1205 are performed after the SIFS has elapsed from F1202 (F1203).

In F1206, the CSI calculation unit 314 of the STA 103 calculates the CSI. In F1207, the STA 103 transmits a frame including a CSI report field 900 in FIG. 9 to the AP 102. In F1208, the AP 102 performs sharing of the CSI to and from the AP 105. Note that, this sharing may be performed when sharing data for the STA 103 between the AP 102 and the AP 105 or immediately prior to a transmission of data to the STA 103. Note that a configuration may be taken so as to perform the transmission in F1202 without performing the transmission in F1201 or F1203. In such a case, the AP 105 can control an address and a timing for the NDP transmission in F1205 in accordance with the content of a sounding TF in F1201 from the AP 102.

<Simultaneous NDP Transmission (No BFRP TF)>

FIG. 13 is a sequence in which the CSI processing capability of the STA 103 is determined to be "medium" ("medium" in step S602) and the sounding method that is selected in F1112 in FIG. 11 is "a case of a simultaneous NDP transmission (with BFRP TF)" (step S604, step S605). The processing from F1201 to F1205 are the same as in the case of "simultaneous NDP transmission (no BFRP TF)" in FIG. 12.

The difference from FIG. 12 is that the AP 102 transmits a BFRP TF (BeamForming Report Poll Trigger Frame) to the STA 103 in F1301. This BFRP TF can be achieved by a frame of the same format as the Trigger Frame 800 in FIG. 8. In such a case, the value of the Trigger Type 811 is "7". Further, the AP 102 decides a padding for CSI (step S604). As described above, the AP 102 decides the padding time for CSI so that the larger the CSI processing capability is in relation to the CSI processing capability that is classified in the same "medium" level, the shorter the padding time for CSI. Note that this means that the number of bits of the padding 807 in FIG. 8 will further increase. The padding 807 is data whose bit sequence is all 1. The STA (terminal) that is analyzing the structure of the trigger frame indicated in FIG. 8 can determine that the Per User Info 806 is ended in accordance with the data whose bit sequence is all 1. This determination is by the IEEE 802.11ax standard.

Further, the STA can allocate the calculation resource of the control unit 202 to another processing from the analysis of the trigger frame by this end determination. Note that the CSI calculation by the STA 103 in F1302 in FIG. 13 starting in the middle of a padding for CSI is a schematic representation of that. Here, in this sequence diagram, time elapses in a direction from the top to the bottom. Also, the length of F1302 in a longitudinal direction being longer than the length of F1206 in a longitudinal direction indicates that the CSI calculation capability in the STA 103 is lower.

By such a configuration of the BFRP TF, the STA 103 in F1207 can perform a CSI transmission after the SIFS elapses from the end of the padding 807 including a padding for CSI. The processing in F1208 is the same as in a case of "simultaneous NDP transmission (no BFRP TF)" in FIG. 12.

Note that in FIG. 13, the STA 103 starts a CSI calculation in F1302 after receiving the BFRP TF in F1301. The flow of this processing is an example and a configuration may be taken such that the STA 103 starts a CSI calculation after receiving an NDP in F1204 and F1205, temporarily interrupt the calculation during the reception of BFRP TF in F1301, and then resume the calculation after determining that the Per User Info 806 is ended.

<Sequential NDP Transmission>

FIG. 14 is a sequence in which the CSI processing capability of the STA 103 is determined to be "low" ("low" in step S602) and the sounding method that is selected in F1112 in FIG. 11 is "a case of a sequential NDP transmission" (step S606). The processing in F1201 is the same as in a case of "simultaneous NDP transmission (no BFRP TF)"

in FIG. 12. In F1401, the AP 102 transmits an NDPA (NDP Announcement) to the STA 103. In F1402, the AP 105 transmits the NDPA to the STA 103. In F1403, the AP 102 transmits the NDPA to the STA 103. In F1404, the STA 103 calculates and then holds the CSI. In F1405, the AP 105 transmits an NDP to the STA 103. As described above, "in a case of a sequential NDP transmission", the AP 102 (Master-AP) and the AP 105 (Slave-AP) transmit an NDP to the STA 103 at their respective timings (F1403, F1405).

In F1406, the STA 103 calculates and then holds the CSI. In F1407, the AP 102 transmits the BFRP TF of the STA 103. In this BFRP TF, the padding for CSI that is included in the BFRP TF that is transmitted by the AP 102 in F1301 in FIG. 13 is not added. The reason is that it is assumed that in the STA 103, a CSI calculation that is related to one NDP is possible within the SIFS time. The processing from F1207 and F1208 are the same as in the case of "simultaneous NDP transmission (no BFRP TF)" in FIG. 12.

Note that the above embodiment is something to be applied in all multi-AP coordination configurations; however, a configuration may be taken so as to limit the use case to a case of null steering or a JTX (Joint Transmission) that uses a D-MIMO (Distributed Multiple Input Multiple Output).

Also, in any of the cases in FIG. 12 to FIG. 14, data transmission to the STA 103 is performed by control of the AP 102 after the AP 102 and the AP 105 have received the CSI report (step S608).

As described above, each AP can obtain the CSI from the STA at a desired timing without reducing the amount of information by performing the sounding processing by a method decided in accordance with the CSI processing capability of the STA. By this, it becomes possible to achieve high-speed/high-efficiency/stable wireless communication by the multi-AP coordination configuration. Also, by executing sounding without reducing the CSI, it becomes possible to achieve improvement in usage efficiency of a wireless medium and system-wide and individual communication speed and stability which are the aims of the IEEE802.11be standard.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-002435, filed Jan. 9, 2020, which is hereby incorporated by reference herein in its entirety.

What is claimed is:

1. A communication apparatus operable to act as an AP supporting IEEE 802.11 standard series in a multi-AP (access point) coordination configuration, the communication apparatus comprising:

at least one processor; and at least one memory storing instructions that are performed by the at least one processor to cause the communication apparatus to function as:

receiving unit configured to receive a predetermined frame including information of sounding capability from a terminal apparatus;

selecting unit configured to select, based on the information of sounding capability, a sounding method from a plurality of sounding methods which is a method for transmitting a null data packet (NDP) for receiving a channel state information (CSI) report as feedback from a terminal apparatus that is connected to the communication apparatus; and transmitting unit configured to transmit the NDP according to the sounding method selected by the selecting unit.

2. The communication apparatus according to claim 1, wherein the plurality of sounding methods include at least a first sounding method in which the communication apparatus and another AP in the multi-AP coordination configuration simultaneously transmit a NDP and a second sounding method in which the communication apparatus and said another AP transmit the NDP at separate timings.

3. The communication apparatus according to claim 1, wherein the plurality of sounding methods include at least a first sounding method in which the communication apparatus and another AP in the multi-AP coordination configuration simultaneously transmit a NDP and a second sounding method in which the communication apparatus transmits a beamforming report poll trigger frame (BFRP TF) after the communication apparatus and said another AP have simultaneously transmitted the NDP.

4. The communication apparatus according to claim 1, wherein the plurality of sounding methods include at least a first sounding method in which the communication apparatus transmits a beamforming report poll trigger frame (BFRP TF) after the communication apparatus and another AP have simultaneously transmitted the NDP and a second sounding method in which the communication apparatus and said another AP transmit the NDP at separate timings.

5. The communication apparatus according to claim 1, wherein the information of sounding capability is indicated by two or more values.

6. The communication apparatus according to claim 1, wherein the information of sounding capability is indicated by a value of a trigger frame MAC padding duration.

7. The communication apparatus according to claim 1, wherein the information of sounding capability is indicated by a capabilities element within an information element in the predetermined frame.

8. The communication apparatus according to claim 1, wherein the predetermined frame is one of a beacon, a probe request/response, an association request/response, and an authentication request/response frame.

9. A control method of a communication apparatus operable to act as an AP supporting IEEE 802.11 standard series in a multi-AP (access point) coordination configuration, the control method comprising:

receiving a predetermined frame including information of sounding capability from a terminal apparatus, and selecting, based on the information of sounding capability, a sounding method from a plurality of sounding methods which is a method for transmitting a null data packet (NDP) for receiving a channel state information (CSI) report as feedback from a terminal apparatus that is connected to the communication apparatus; and transmitting the NDP according to the selected sounding method.

10. The control method according to claim 9, wherein the plurality of sounding methods include a first sounding method in which the communication apparatus and another AP in the multi-AP coordination configuration simultaneously transmit a NDP and a second sounding method in which the communication apparatus and said another AP transmit the NDP at separate timings.

11. The control method according to claim 9, wherein the plurality of sounding methods include a first sounding method in which the communication apparatus and another AP in the multi-AP coordination configuration simultaneously transmit a NDP and a second sounding method in which the communication apparatus transmits a beamforming report poll trigger frame (BFRP TF) after the communication apparatus and said another AP have simultaneously transmitted the NDP.

12. The control method according to claim 9, wherein the plurality of sounding methods include a first sounding method in which the communication apparatus transmits a beamforming report poll trigger frame (BFRP TF) after the communication apparatus and another AP have simultaneously transmitted the NDP and a second sounding method in which the communication apparatus and said another AP transmit the NDP at separate timings.

13. The control method according to claim 9, wherein the information of sounding capability is indicated by two or more values.

14. The control method according to claim 9, wherein the information of sounding capability is indicated by a value of a trigger frame MAC padding duration.

15. The control method according to claim 9, wherein the information of sounding capability is indicated by a capabilities element within an information element in the predetermined frame.

16. The control method according to claim 9, wherein the predetermined frame is one of a beacon, a probe request/response, an association request/response, and an authentication request/response frame.

17. A non-transitory computer-readable storage medium storing a computer program for causing a computer to execute a control method of a communication apparatus operable to act as an AP supporting IEEE 802.11 standard series in a multi-AP (access point) coordination configuration, the control method comprising:

receiving a predetermined frame including information of sounding capability from a terminal apparatus, and selecting, based on the information of sounding capability, a sounding method from a plurality of sounding methods which is a method for transmitting a null data packet (NDP) for receiving a channel state information (CSI) report as feedback from a terminal apparatus that is connected to the communication apparatus; and transmitting the NDP according to the selected sounding method.

* * * * *